D. S. Ames.
Corn-Planter

Nº 75825.  Patented Mar. 24, 1868.

Witnesses  
H. Pauli  
R. Simon

Inventor  
D. S. Ames  
By his Attys.  
M. Randolph & Co.

United States Patent Office.

D. S. AMES, OF LACLEDE, MISSOURI, ASSIGNOR TO HIMSELF AND JOHN F. PERSHING, OF SAME PLACE.

Letters Patent No. 75,825, dated March 24, 1868.

---

IMPROVEMENT IN CORN-PLANTERS.

---

The Schedule referred to in these Letters Patent and making part of the same.

---

TO ALL WHOM IT MAY CONCERN:

Be it known that I, D. S. AMES, of Laclede, in the county of Linn, and State of Missouri, have made certain new and useful Improvements in Corn-Planters; and I do hereby declare that the following is a full and clear description thereof, reference being had to the accompanying drawings, and to the letters of reference marked thereon.

The object of this invention is to produce a cheap and effective machine for planting corn or other seeds by hand-power, the devices used being somewhat similar to those used in Mr. Hughes' patent of 1857, but at the same time being greatly superior to the Hughes machine, both as relates to cheapness of construction and reliability of action.

To enable those skilled in the art to make and use my improved planter, I will proceed to describe its construction and operation.

Figure 1:
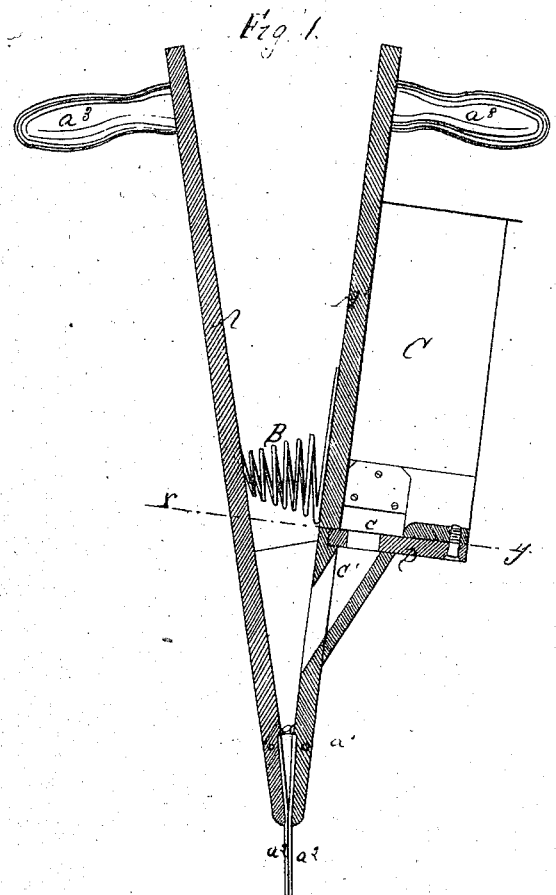

Figure 1 of the drawings is a vertical sectional elevation.

Figure 2:
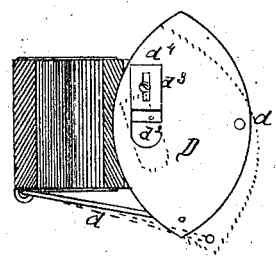

Figure 2 is a horizontal plan of the same, taken on the line $x\ y$ of fig. 1.

This machine, like that of the Hughes patent, has two legs, A A', which are hinged together by means of the metallic plates $a$, one of which is placed each side of the legs, and securely fixed to the leg A, while a single pin at $a^1$ serves as the pivot or hinge-point. The bottom ends of the legs A A' are shod with iron blades $a^2$, which enter the ground and prepare an opening for the seeds, which are to fall between them into the opening in the ground thus prepared for them, and which will close over the seeds and cover them at the proper depth, when the blades are withdrawn. There is a spring, B, placed between the two legs A A', above the pivot-point $a^1$, which will habitually hold the upper ends of the said legs asunder, unless pressed together by the operator, who will, while operating the machine, take hold of the handle $a^3$. A magazine or hopper, C, is attached to the leg A', and a dropping-slide, D, is pivoted to the bottom of this hopper by means of the pin or screw $d$. The connecting-rod $d^1$ has one of its ends attached to the leg A, and the other end to the outer end of the dropping-slide.

At each motion of opening and closing the legs, the slide D will make one complete oscillating stroke, as indicated by the dotted lines in fig. 2; this will place the seed-orifice $d^2$, belonging to the said slide, alternately in communication with the orifice $c$ of the hopper, and the tube $c'$ leading to the ground. The adjustable plate $d^3$ may be regulated by means of the set-screw $d^4$, so as to make the orifice $d^2$ of any required size. The brush $d^5$ will prevent more than a certain amount of seed from entering the tube $c'$ at each stroke of the machine, and thus render the clogging or irregular dropping of the machine an impossibility. The arrangement of the feed-slide D, herein represented, is much more efficient than any of the devices heretofore produced for this purpose.

Having described my invention, what I claim, is—

The legs A A' and the hopper C, when combined with the dropping-slide D, and otherwise arranged, as herein described and set forth.

In testimony of which invention, I hereunto set my hand, this 21st day of November, A. D. 1866, in presence of—

D. S. AMES.

Witnesses:
 M. RANDOLPH,
 GEO. P. HERTHEL, Jr.,
 H. PAULI.